United States Patent [19]
Richter

[11] Patent Number: 5,775,171
[45] Date of Patent: Jul. 7, 1998

[54] ROBOT WRIST MECHANISM

[76] Inventor: Hans Richter, Ortlerstrasse 77, D-86163 Augsburg, Germany

[21] Appl. No.: 514,248

[22] Filed: Aug. 11, 1995

[30] Foreign Application Priority Data

Aug. 12, 1994 [DE] Germany .................. 44 28 488.8

[51] Int. Cl.$^6$ .................................................. B25J 17/02
[52] U.S. Cl. ................... 74/490.06; 414/729; 901/29
[58] Field of Search .................. 414/729; 74/490.06, 74/490.01; 901/29

[56] References Cited

U.S. PATENT DOCUMENTS

| 3,922,930 | 12/1975 | Fletcher . | |
|---|---|---|---|
| 4,140,226 | 2/1979 | Richter . | |
| 4,832,563 | 5/1989 | Massmann . | |
| 5,271,292 | 12/1993 | Sawada | 74/490.04 |
| 5,305,653 | 4/1994 | Ohtani | 74/490.03 |
| 5,549,018 | 8/1996 | Nhei | 74/490.03 |

FOREIGN PATENT DOCUMENTS

| 0 255 612 | 3/1988 | European Pat. Off. . |
|---|---|---|
| 0 443 576 | 8/1991 | European Pat. Off. . |
| 271 810 | 9/1989 | German Dem. Rep. . |
| 2 019 351 | 1/1971 | Germany . |
| 26 27 490 | 6/1977 | Germany . |

OTHER PUBLICATIONS

Schlatter AG: Brochure "HDS–System Richter", 1978.

*Primary Examiner*—Charles A. Marmor
*Assistant Examiner*—David M. Fenstermacher
*Attorney, Agent, or Firm*—Antonelli, Terry, Stout & Kraus, LLP

[57] ABSTRACT

A robot wrist for the working hand of a robot has a connection element for connection to a robot arm along the main axis thereof, and a toolholder hinged to the connection element which has tool receiver axis and which can turn about a second axis normal to the main axis. One portion of the tool holder can pivot about a third axis parallel with the tool receiver axis and in the stretched position of the wrist in parallel with the main axis. The distances between the third axis and the tool receiver axis and between the third axis and the main axis are equal.

9 Claims, 5 Drawing Sheets

ROBOT WRIST MECHANISM

FIELD OF THE INVENTION

This invention relates to a wrist for the working hand of a robot and to a robot arm incorporating such a wrist.

BACKGROUND TO THE INVENTION

A robot with which a working hand having a wrist of a type that may be used with the invention is described in German Patent DE-A 26 27 490. This robot has at its disposal a five-bar frame, a robot arm and a gripper fitted to the end of the robot arm.

Since this German Patent, however, elaborate working hands have been developed to replace the simple grippers described therein and by which the robot can perform a plurality of jobs. Modern industrial robots can, for example, with the working hand, screw, weld, solder and themselves grasp and exchange the tool necessary for doing this.

Known working hands for robots have wrists such as, for example, those described in the brochure No. 8.105.11.78 5M from the firm of H. A. SCHLATTER AG. These form not merely the extension of the robot arm but are mounted on the end of it. Thus their tool receiver axis is not co-linear with the axis of the robot arm but parallel with it. This has the advantage that the robot hand can, for example, be turned through 360° in order to be able to work from the side or to change the tool. But because of the offset between the two axes, as the working hand of the robot follows up, for example, in the execution of seam welds, a high computational overhead is required since deviations caused by the offset must be constantly corrected out.

A problem therefore exists of improving a wrist for the working hand of a robot in such a way that on the one hand it exhibits a good all round mobility and on the other hand a simple ability to follow up.

SUMMARY OF THE INVENTION

According to an embodiment of the present invention a robot wrist for the working hand of a robot comprises a connection element for connection to a robot arm along the main axis thereof, a toolholder hinged to the connection element and having a tool receiver axis and which can turn about a second axis normal to the main axis, and in which one portion of the tool holder can pivot about a third axis parallel with the tool receiver axis and in the stretched position of the wrist in parallel with the main axis, the distances between the third axis and the tool receiver axis being equal and between the third axis and the main axis being equal.

The invention also includes a robot arm incorporating the wrist as set forth.

BRIEF INTRODUCTION TO THE DRAWINGS

The invention can be performed in many ways and two embodiments will now be described by way of example and with reference to the accompanying drawings in which:

FIG. 1 is a side elevation of a robot having a wrist and showing a range of adjustment;

FIGS. 2a, 2b, and 2c are side elevations of the wrist shown in FIG. 1 in three positions (a,b,c,) of pivot of the toolholder;

DETAILED DESCRIPTION OF PREFERRED EMBODIMENTS

Figure 1:
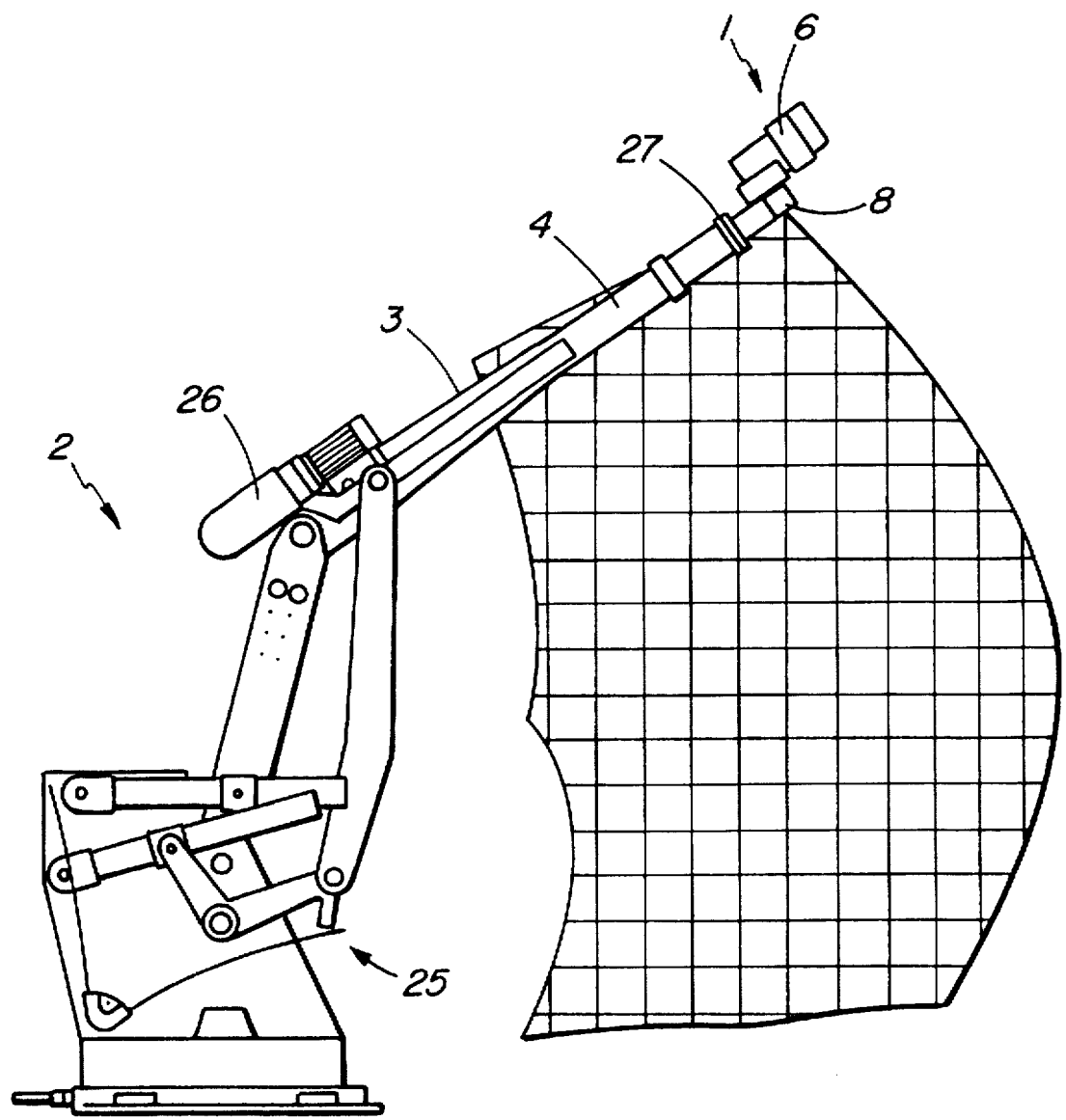

FIG. 1 shows a five-bar robot 2 comprising a frame 25 containing the bars, a robot arm 3 and a wrist 1 according to the invention together with a drive 26 for the wrist. The wrist 1 is mounted at the end of the robot arm 3 and is moved by the drive 26 by means of shafts running through the robot arm 3. The wrist 1 is shown more clearly in FIG. 2a).

Figure 2A:
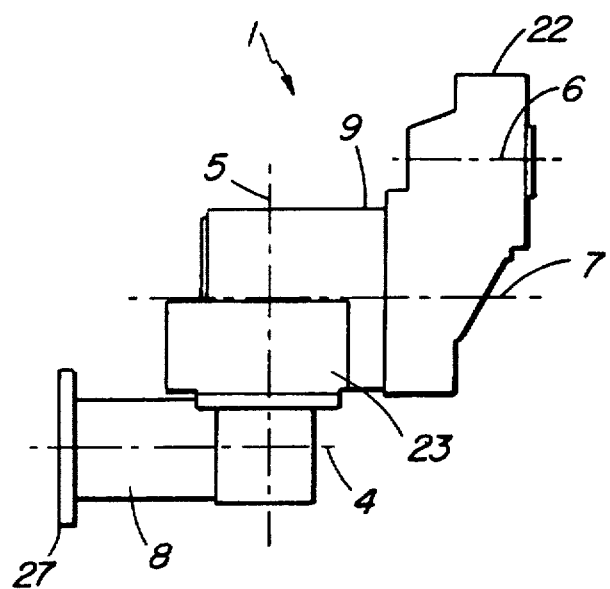

As may be seen from FIG. 2a) in combination with FIG. 1, the wrist 1 has a connection element provided by a tubular member 8 which is connected to the robot arm 3 by means of a flange connection 27. The longitudinal axis of this tubular member 8 defines the main axis 4 of the robot arm 3.

A toolholder 9 of the wrist 1 is mounted rotatably on the side of the tubular member 8. The toolholder 9 is able to turn through 360° and more about a second axis 5 running at right angles to the main axis 4; thus it can rotate endlessly about the second axis 5. A tool-receiver axis 6 of the toolholder 9 runs in parallel with the main axis 4 when the wrist is in the extended position.

In the case of the wrist 1 in accordance with the invention there is a third axis 7 which runs in parallel with the main axis 4 and the tool-receiver axis 6, that is, at right angles to the second axis 5 when the wrist is in the extended position. The third axis 7 is at the same distance from the main axis 4 and the tool-receiver axis 6. A movable portion 22 of the toolholder 9 can pivot with respect to a fixed portion 23 about this third axis 7.

Figure 2B:
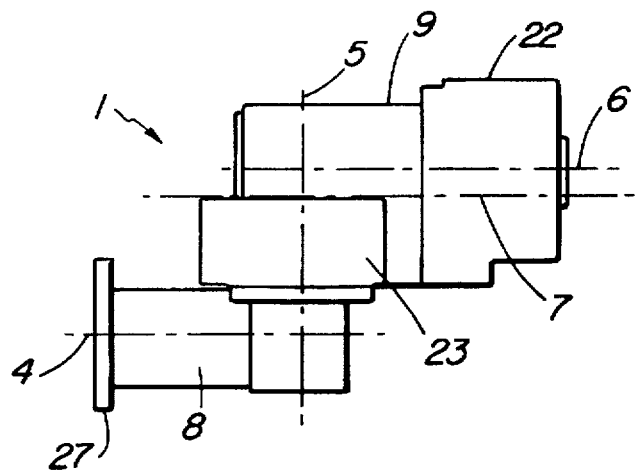

Three advantageous positions of pivot of the movable portion 22 of the toolholder 9 are shown in FIGS. 2a), 2b), and 2c). In FIG. 2a) the main axis 4, the tool-receiver axis 6 and the third axis 7 are lying in one plane. The position shown is also possible in the case of conventional wrists. A pivoting of the movable portion 22 of the toolholder 29 through 90° leads to the position shown in FIG. 2b). This is advantageous if in the range which is to be processed there is little headroom.

Figure 2C:
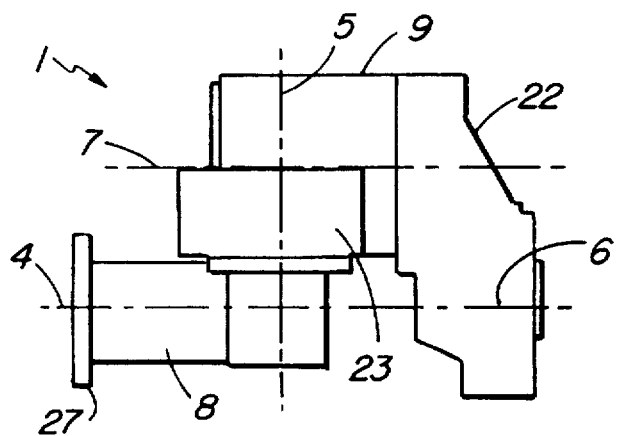

A further pivoting of the movable portion 22 in the same direction of rotation leads to the position shown in FIG. 2c). Because of the equal distances of the main axis 7 and tool-receiver axis 6 from the third axis 7, the main axis 4 and the tool-receiver axis 6 are now coaxial with one another. Adoption of this position is advantageous, for example, if seam welds are to be drawn, since through the arrangement of the tool-receiver axis 6 coaxially with the main axis 4 of the robot arm 3 the follow-up of the wrist 1 sharply reduces the computational overhead. Furthermore this position requires the least room for the wrist 1.

Locking of the movable portion 22 of the toolholder 9 with respect to the fixed portion 23 can be effected by means of pins, either automatically, or manually. In the case of manual actuation the pins (not shown) are first removed, the movable portion 22 is then brought into one of the positions a, b or c, and the pins are pushed in again and secured. Instead of the three positions shown, there may be more or fewer positions; for example, there may be continuous adjustability.

Figure 3:
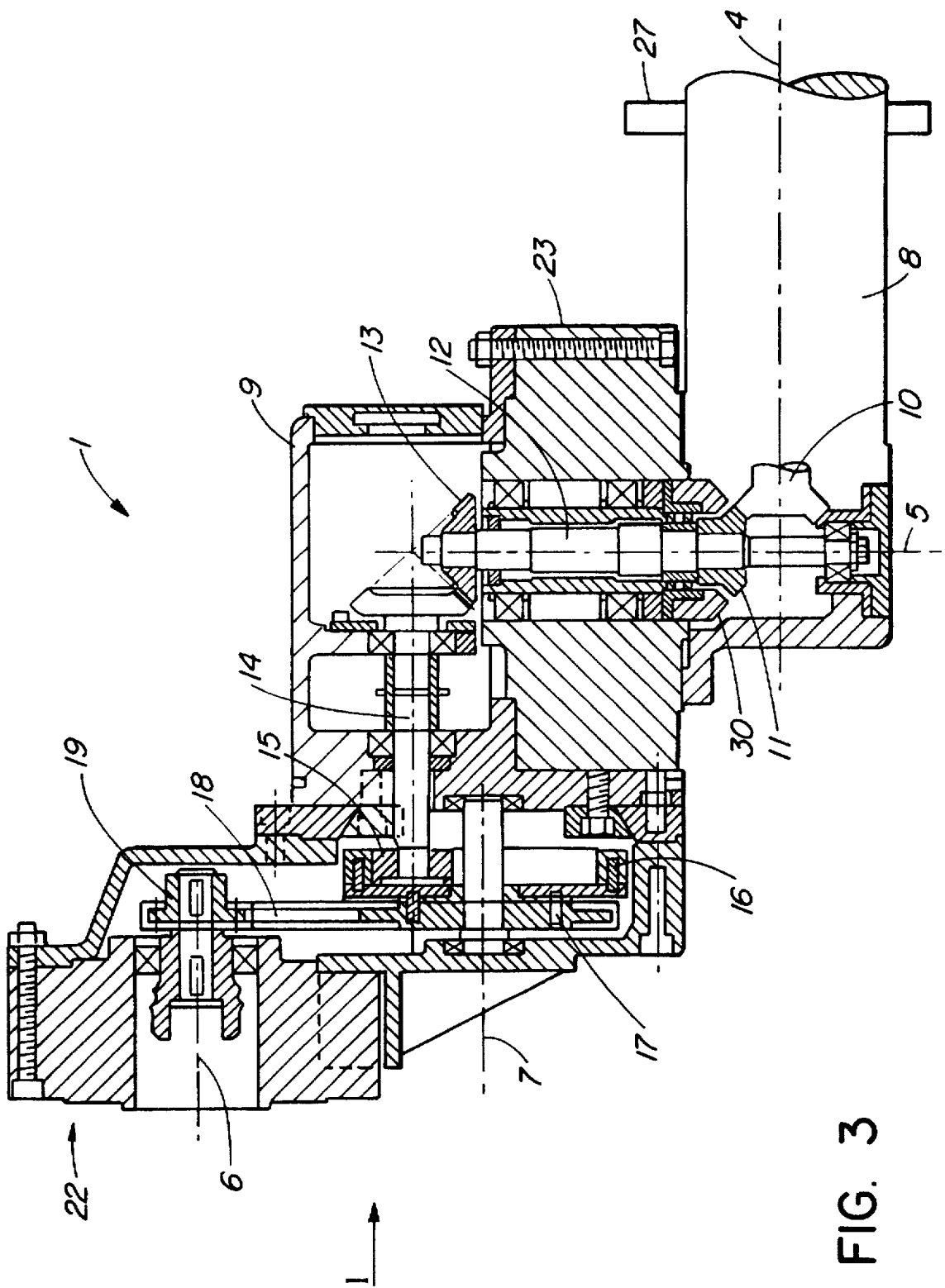
FIG. 3 is a longitudinal section through the wrist.

The internal construction of the wrist 1 is shown in FIG. 3. A tubular member 8 has a flange 27 for connection to a robot arm 3 (not shown). The robot arm 3 and the tubular piece 8 have a common main axis 4. Two shafts run inside the robot arm 3 and the tubular member 8, namely, a shaft 10 and a hollow shaft (not shown) running coaxially with the latter.

The inner shaft 10 carries at its end a bevel wheel and via a pair of bevel gears 11 drives a second shaft 12 running in the second axis 5. At its other end the second shaft 12 likewise carries a bevel wheel which is part of a pair of bevel gears 13 which drive a third shaft 14 running horizontally. At the end of the third shaft 14 there is an externally toothed gearwheel 15 which is in engagement with a larger internally toothed gearwheel 16. This internally toothed gearwheel 16 rotates about the third axis 7 and is rigidly connected to a first sprocket 17. A chain 18 runs from the first sprocket 17 to a second sprocket 19 which is journalled about the tool-receiver axis 6 and drives the tool receiver. Thus the tool receiver 6 can be driven even during pivoting of the movable portion 22 of the toolholder 9 about the third axis 7. The outer diameter of the externally toothed gearwheel 15 is essentially identical with that of the second sprocket 19, so that a 1:1 transmission is effected between the pair of gearwheels. Thus as a result the tool-receiver axis 6 turns at the same r.p.m. as the driving shaft 10.

The hollow shaft (not shown) inside the tubular member 8 drives in rotation via a pair of hand gears 30 the portion 23 of the toolholder 9 which—with respect to pivoting about the third axis 7—is fixed. This rotation can logically only be activated if the toolholder is not lying in the position shown in FIG. 2c), in which free rotation is not possible.

Figure 4:
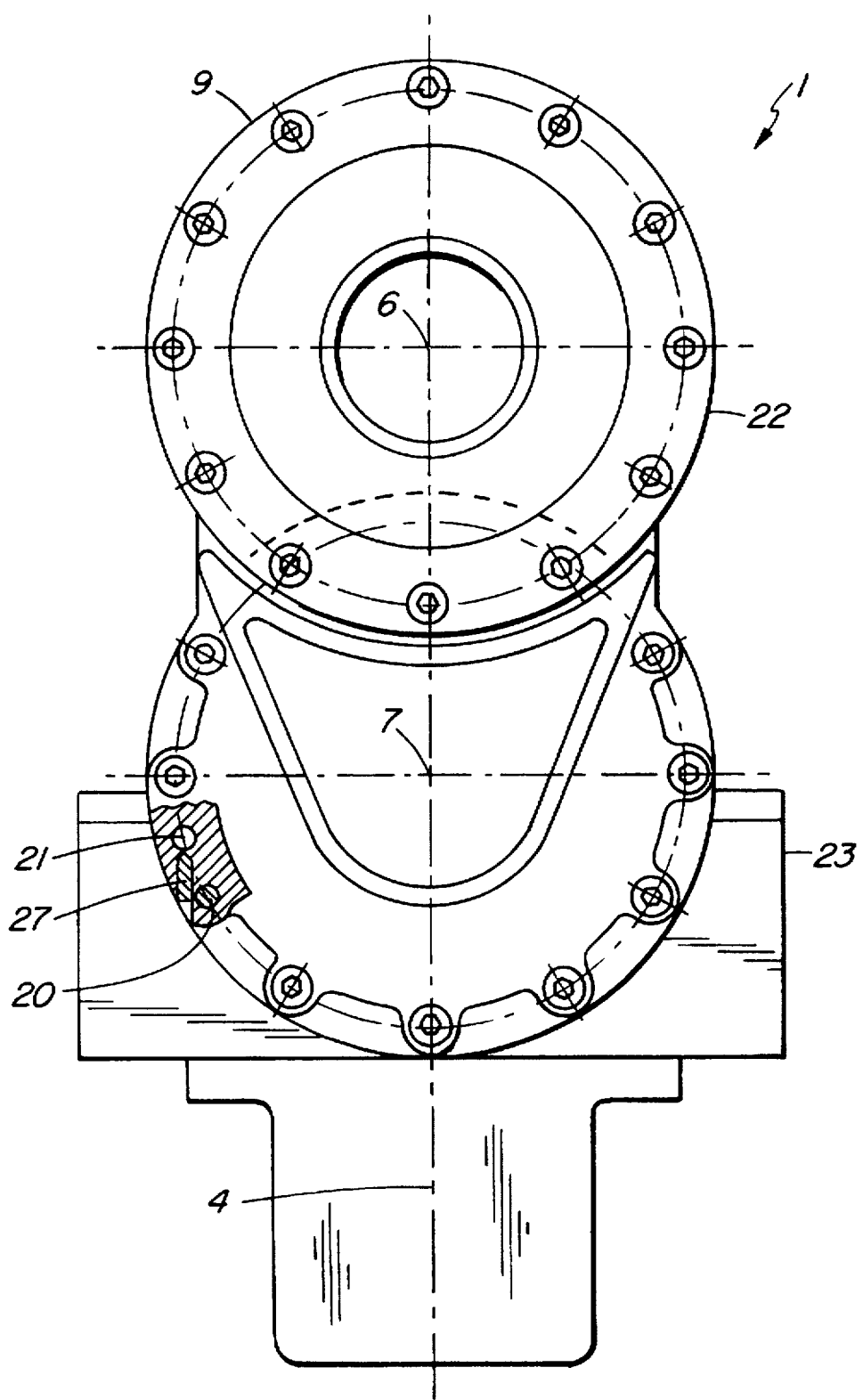
FIG. 4 is a front elevation of the wrist in the direction of the arrow I in FIG. 3.

The location of the movable portion 22 of the toolholder 9 may be seen from FIG. 4, which shows a front elevation of the wrist 1 in accordance with FIG. 3. A drilled hole is provided in the movable portion 22, through which a pin 21 may be inserted into a receiver hole in the fixed portion 23. When the pin is in position in the drilled hole it can be secured by means of a grubscrew. As many receiver holes are provided in the fixed part 23, as there are several possible positions of pivot, thus in the present example three.

Figure 5:
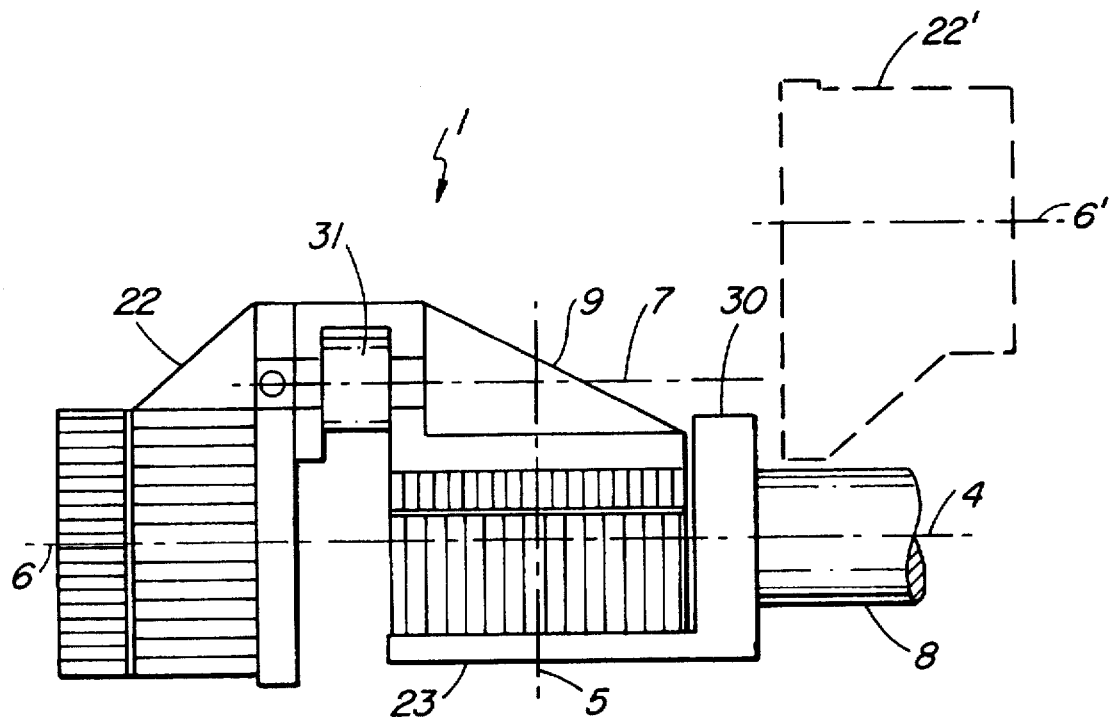
FIG. 5 is a side elevation of a special embodiment of the wrist.
Figure 6:
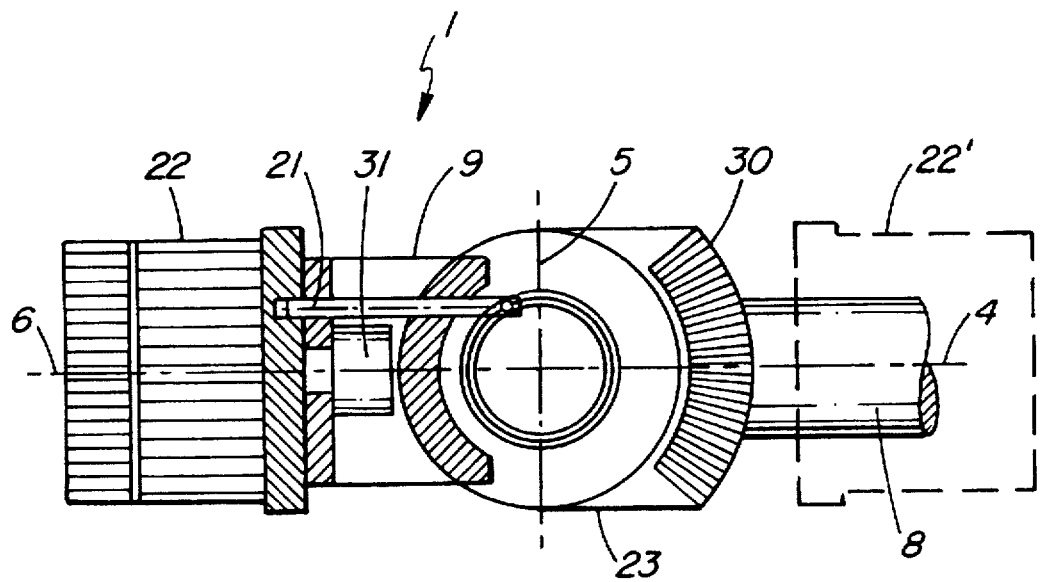
FIG. 6 is a view from above, of the embodiment shown in FIG. 5.

A particularly advantageous embodiment of the invention is shown in FIGS. 5 and 6. In this construction the same reference numerals are used to indicate similar parts. Here the fixed portion 22 of the toolholder 9 has a set of teeth 30 in the shape of an arc. There is a corresponding set of teeth 31 on the movable portion 22 of the toolholder 9. Both sets of teeth lie at the same distance radially from the second axis 5.

The following effect is caused by the two sets of teeth 30 and 31: as soon as the movable portion 22 of the toolholder 9, starting from a co-axial position of the main axis 4 and tool-receiver axis 6, has turned through a certain range of angle, say 135° in either direction about the second axis 5, the set of teeth 31 on the movable portion 22 comes into meshing engagement with the set of teeth 30 on the fixed portion 23 of the toolholder. This engagement has the effect that as the movable part 22 turns further about the second axis 5, it also pivots upwards about the third axis 7. This ensures that the movable portion 22 does not collide with the fixed portion 23 of the toolholder 9 or with the tubular member 8. The sets of teeth 30 and 31 are so formed so that as the movable portion 22 turns about the axis 5 through 180°, a rotation through 180° also takes place about the third axis 7, so that after this movement the movable portion 22 adopts the position 22' shown in broken lines in FIGS. 5 and 6 and the tool-receiver axis 6 lies in the position 6' shown in broken line. Preferably the locking of the movable portion 22 with respect to the fixed portion 23 is effected by means of pins 21. In a preferred embodiment these are released before the start of the rotary motion and the movable portion 22 is terminated, and after the pivoting is completed they are reintroduced so that a rigid connection is again produced between the two portions.

I claim:

1. A robot wrist for attaching a working hand of a robot to a robot arm comprising in combination:

a connection element for connection of the wrist to the arm which defines a main axis of rotation for the wrist;

a tool holder comprising a first part and a second part in which the first part is rotatably attached to the connection element so that the first part can turn about a second axis normal to the main axis, and the second part is rotatably attached to the first part so that the second part can turn about a third axis parallel to the main axis, and a tool receiver rotatably attached to the second part, and which defines an axis of rotation for the tool receiver parallel to the main axis, wherein when the tool receiver is in a fully extended position furthest from the main axis the distance between the main axis and the third axis, and between the third axis and the tool receiver axis, are the same.

2. A wrist as claimed in claim 1 in which the second part of the tool holder in the course of its pivoting range about the third axis may be fixed in at least two positions 180° apart, so that in the second position the tool axis is coaxial with the main axis.

3. A wrist according to claim 2 wherein the location of the first part of the tool holder relative to the connection element is effected by means of at least one pin inserted into cooperating holes in the connection element and the first part of the tool holder.

4. A wrist as claimed in claim 2 in which a drive to the tool receiver is effected by a shaft which rotates inside the connection element and is connected to a first drive shaft in the robot arm.

5. A wrist according to claim 4 wherein the location of the first part of the tool holder relative to the connection element is effected by means of at least one pin inserted into cooperating holes in the connection element and the first part of the tool holder.

6. A wrist as claimed in claim 1 in which a drive to the tool receiver is effected by a shaft which rotates inside the connection element and is connected to a first drive shaft in the robot arm.

7. A wrist as claimed in claim 6 in which a drive to the first part of the tool holder is effected by a second hollow shaft drive shaft coaxial with the first shaft in the robot arm.

8. A wrist as claimed in claim 7 in which the drive for the tool receiver is provided from the first drive shaft via a first pair of bevel gears to a second shaft rotating about the second axis, via a second pair of bevel gears from the second shaft to a third shaft rotating parallel to the third axis carrying an externally toothed gearwheel engaging an internally toothed gearwheel rotating about the third axis, via a first sprocket fixed to the internally toothed gearwheel, a chain and a second sprocket attached to the tool receiver, whereby the tool receiver is rotated about the tool receiver axis.

9. A wrist according to claim 8 wherein the externally toothed gearwheel is substantially the same diameter as the second sprocket.

* * * * *